United States Patent
Hassler et al.

(10) Patent No.: US 8,467,463 B2
(45) Date of Patent: Jun. 18, 2013

(54) APPARATUS AND METHOD FOR PRODUCING A SIGNAL TO REDUCE THE PAR IN A MULTICARRIER SYSTEM

(75) Inventors: Bernd Hassler, Illerkirchberg (DE); Bjoern Jelonnek, Ulm (DE); Gunter Wolf, Ulm (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 841 days.

(21) Appl. No.: 12/312,578

(22) PCT Filed: Oct. 24, 2007

(86) PCT No.: PCT/EP2007/061437
§ 371 (c)(1),
(2), (4) Date: Dec. 31, 2009

(87) PCT Pub. No.: WO2008/058840
PCT Pub. Date: May 22, 2008

(65) Prior Publication Data
US 2010/0128811 A1 May 27, 2010

(30) Foreign Application Priority Data
Nov. 16, 2006 (EP) .................................... 06023834

(51) Int. Cl.
*H04L 27/28* (2006.01)
(52) U.S. Cl.
USPC ........................................................ 375/260
(58) Field of Classification Search
USPC ... 375/224, 222, 260, 350; 370/210; 455/308, 455/210
See application file for complete search history.

(56) References Cited

U.S. PATENT DOCUMENTS

| 4,571,613 A | * | 2/1986 | Fukuda | 348/622 |
| 4,748,498 A | * | 5/1988 | Yamanishi et al. | 348/622 |
| 6,356,606 B1 | * | 3/2002 | Hahm | 375/350 |
| 2007/0258528 A1 | * | 11/2007 | Kwun et al. | 375/260 |

FOREIGN PATENT DOCUMENTS

| DE | 198 38 295 A1 | 6/1999 |
| DE | 102 19 318 A1 | 11/2003 |
| EP | 1 248 429 A2 | 10/2002 |

OTHER PUBLICATIONS

Gatherer A et al.,"Controlling clipping probability in DMT transmission"; Signals, Systems & Computers, 1997,Conference Record of the Thirty-First Asilomar Conference on Pacific Groce, CA; USA Nov. 2-5, 1997, Los Alamitos,CA; IEEE Comput. SOC, US; Bd. 1, Nov. 11, 1997, pp. 578-548.

* cited by examiner

*Primary Examiner* — Khai Tran
(74) *Attorney, Agent, or Firm* — Staas & Halsey LLP (57) ABSTRACT

An apparatus produces a reduction signal for a signal having a plurality of subcarriers. The apparatus has a limiter which is designed to produce a limited signal from the signal having a plurality of subcarriers;—a coefficient ascertainment unit which is designed to determine coefficients for unused subcarriers of the signal having a plurality of subcarriers from the limited signal; and—a signal generator which is designed to generate the reduction signal from the coefficients. The reduction signal is able to be combined with the signal in order to form a reduced signal. The coefficient ascertainment unit is designed to project the limited signals onto a K-th base formula.

17 Claims, 6 Drawing Sheets

APPARATUS AND METHOD FOR PRODUCING A SIGNAL TO REDUCE THE PAR IN A MULTICARRIER SYSTEM

CROSS REFERENCE TO RELATED APPLICATIONS

This application is based on and hereby claims priority to PCT Application No. PCT/EP2007/061437 filed on Oct. 24, 2007 and EP Application No. EP06023834 filed on Nov. 16, 2006, the contents of which are hereby incorporated by reference.

BACKGROUND OF THE INVENTION

OFDM (Orthogonal Frequency Division Multiplexing) and OFDMA (Orthogonal Frequency Division Multiple Access)-based mobile radio standards are multicarrier systems. The combination of the individual carriers results in a signal whose maximum instantaneous power considerably exceeds the mean power. Furthermore, higher-quality modulation methods, such as QPSK (Quadrature Phase Shift Keying), 8PSK (Phase Shift Keying) and 16 QAM (Quadrature Amplitude Modulation) can also be used with more than two possible information states per transmission symbol, in order to modulate the various carriers that are used. In the case of these modulation methods, constancy of the instantaneous transmission power in the individual carrier is dispensed with in favor of higher data transmission rates.

Depending on the modulation method and combination of the individual carriers, the maximum instantaneous power of a transmission signal in multicarrier systems may be considerably higher than the mean value of the transmission power. The ratio of the maximum to the mean transmission power is referred to as the peak to average ratio (PAR>1) or peak to average power ratio (PAPR>1). One problem is now that, when the PAR is relatively high, the result of limiting or clipping effects. This increases the complexity and power consumption of the amplifier, and reduces the efficiency of the overall system.

By way of example, DE 10219318 A1 relates to a method for forming a carrier-frequency output signal from a plurality of partial signals of a base frequency band. Each partial signal is amplitude-limited in a main branch. Furthermore, estimated values are determined for each partial signal in a parallel secondary branch, by which estimated values the amplitude limiting in the main branch is controlled.

DE 19838295 A1 describes a multicarrier transmission method for parallel transmission of information in the form of a signal on a plurality of subchannels. A correction function is in each case applied by a threshold value decision to subchannels which are precluded from information transmission, such that a ratio between a peak value of the signal and the root mean square value of the signal is minimized or at least reduced.

EP 1248429 A2 describes a DMT (Discrete Multitone) modulation method which allows the ratio of the maximum to the mean transmission power of a signal to be transmitted to be reduced. For this purpose, a trial value of a limiting prevention signal is established first of all, and a determination is made as to whether the limiting prevention signal is suitable for limiting the signal to be transmitted. If this is not the case, then the limiting prevention signal is varied until it is suitable for limiting the signal to be transmitted. The limiting prevention signal, which in the end is suitable, is transmitted using unused subcarriers of the signal to be transmitted, in order to reduce the peak power values of the signal to be transmitted. An iteration loop is used in order to determine the suitable limiting prevention signal. However, this can lead to different signal delays since it is not known from the start how often the iteration loop will be passed through.

SUMMARY

One potential object is now to propose an apparatus and a method for producing a reduction signal for a signal having a plurality of subcarriers, wherein the reduction signal may be used to form a reduced signal from the signal having a plurality of subcarriers.

One major idea of the inventors is to limit a signal which is to be reduced and has a plurality of subcarriers, in particular the amplitude of the signal, to calculate coefficients for unused subcarriers of the signal from the limited signal, and to use these coefficients to produce a reduction signal which can be combined with the original signal, that is to say the signal to be reduced, in order to reduce the peak values and therefore the PAR of the signal to be reduced. In particular, this makes it possible to achieve frequency-selective limiting of a signal in baseband, which is considerably more efficient than conventional limiting methods, in particular for multicarrier systems such as OFDM and OFDMA transmission systems. In particular, the proposed method and apparatus make it possible to limit the amplitude of transmission signals in digital complex baseband and to reduce the maximum values of the transmission power to a greater extent than is possible when using the conventional methods as explained initially, in particular without any disturbing losses of signal quality.

Reduction or limiting (clipping) of a signal for the purposes of this discussion means that peak values of the signal and therefore the ratio of the maximum to the mean transmission power of the signal are reduced. The reduced signal therefore corresponds to the original signal, but its amplitude and transmission power may be reduced. In particular, the signal may be a transmission signal in a multicarrier system in which higher-quality modulation methods are used, for example QPSK, 8PSK or 16 QAM with more than two possible information states per transmission symbol. By way of example, this may be a signal in complex baseband of a transmission system. The signal has a plurality of subcarriers. Some of the subcarriers are used for information transmission while the remaining subcarriers are unused, that is to say they are not used for information transmission.

The proposed method and apparatus make it possible to produce a reduction signal by projection of a clipped signal onto the unused subcarriers. Alternatively, other formation rules may also be used which result in a greater reduction in the peak values. There is no need to use an iteration loop to determine the reduction signal, which iteration loop is repeated until a reduced signal is no longer changed by clipping and therefore no longer exceeds a predetermined threshold value on limiting. Instead of this, a fixed predetermined number of reduction stages with a constant signal delay can be used. According to the proposal, a different threshold value is permissible in each reduction stage. The formation rules for the reduction signal and the coefficients may also differ from one reduction stage to another.

The inventors propose an apparatus for producing a reduction signal for a signal having a plurality of subcarriers, comprising a limiter which is designed to produce a limited signal from the signal with a plurality of subcarriers;

a coefficient determiner, which is designed to determine coefficients for unused subcarriers of the signal having a plurality of subcarriers, from the limited signal; and a signal generator which is designed to generate the reduction signal from the coefficients, which reduction signal can be combined with the signal in order to form a reduced signal.

According to one embodiment, the apparatus may furthermore have a combiner which is designed to combine the signal with the reduction signal in order to form the reduced signal. By way of example, the combiner may be in the form of an adder.

The coefficient determiner may be designed to weight the coefficients with weighting factors. The accuracy of the reduction process can be adjusted with the aid of the weighting factors.

The signal may be a modulated signal with more than two possible information states per symbol. Furthermore, the coefficient determiner may be designed to determine the coefficients by symbol-by-symbol projection of the limited signal. In this case, the coefficient determiner can determine the coefficients and the signal generator can determine the reduction signal in each case on the basis of predetermined algorithms or formulae. In particular, the coefficient determiner may be designed, according to one embodiment, to determine the coefficients by symbol-by-symbol projection of the limited signal, comprising N sample values for a symbol $s_n$; $n=1 \ldots N$, onto the k-th base function $$\overline{e}^{+2\pi j \cdot \frac{(k-1)\cdot(n-1)}{N}},$$

which is associated with the k-th unused subcarrier.

According to a further embodiment, the coefficient determiner is designed to calculate a coefficient for the k-th unused subcarrier using the following formula:

$$C_k = \frac{1}{N} \cdot \sum_{n=1}^{N} s_n \cdot e^{-2\pi j \cdot \frac{(k-1)\cdot(n-1)}{N}}, 1 \leq k \leq N$$

Furthermore, according to one embodiment, the signal generator is designed to calculate the reduction signal using the formula $$X_n = \sum_{k=unused} C_k \cdot e^{+2\pi j \cdot \frac{(k-1)\cdot(n-1)}{N}}, n = 1, \ldots N$$

According to one embodiment, the coefficient determiner can be designed to determine the coefficients from the limited signal and the signal. In particular, the coefficient determiner can be designed to determine the coefficients by a matrix operation from the signal and the limited signal.

Furthermore, the limiter can have an adjustable limiting threshold value, by which the limiting of the signal can be adjusted. The limiting threshold value therefore defines how strongly the signal can be limited.

The proposed apparatus is particularly suitable for use in OFDM-based and OFDMA-based communication systems and can result in a major reduction in the PAR and PAPR thus resulting in the requirements for the complexity and power consumption of the transmission amplifier being less stringent than in the case of conventional systems with a high PAR and PAPR.

The inventors also propose a system for producing a time-domain signal from complex input symbols, comprising a converter which is designed to transform the complex input symbols to a signal with a plurality of subcarriers in accordance with a predetermined transformation; and an apparatus for producing a reduction signal for a signal having a plurality of subcarriers, to which the signal having a plurality of subcarriers is applied in order to form a reduced signal, with the reduced signal corresponding to the time-domain signal.

The system may furthermore have a further apparatus for producing a reduction signal, with the apparatuses being connected in series. A further improvement in the PAPR can be achieved by cascading a plurality of PAPR reduction blocks, in the form of the apparatuses.

The predetermined transformation may be an inverse Fourier transformation or an inverse fast Fourier transformation IFFT. The system may be an OFDM-based or OFDMA-based transmission system.

A further embodiment relates to a method for producing a reduction signal for a signal having a plurality of subcarriers, which comprises the following steps:

production of a limited signal from the signal having a plurality of subcarriers;

determination of coefficients for unused subcarriers of the signal having a plurality of subcarriers, from the limited signal; and generation of a reduction signal from the coefficients which can be combined with the signal having a plurality of subcarriers, in order to obtain a reduced signal.

The approach makes it possible to limit the amplitude of transmission signals in digital complex baseband in a particularly advantageous manner and without any disturbing losses of signal quality, and to reduce the maximum values of the transmission power to a greater extent than is possible using conventional methods.

The method furthermore offers the advantage that no additional FFT and IFFT transformations are required.

As a result of the exploitation of greater freedom for signal discrepancies, it is possible to achieve a reduction in the PAR for the same error vector magnitude EVM. This freedom increases in particular in the case of mobile radio systems using higher-quality modulation methods.

The approach makes it possible to use low-power and therefore low-cost amplifiers, in order to achieve a predetermined mean output power without any disturbing losses of signal quality.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
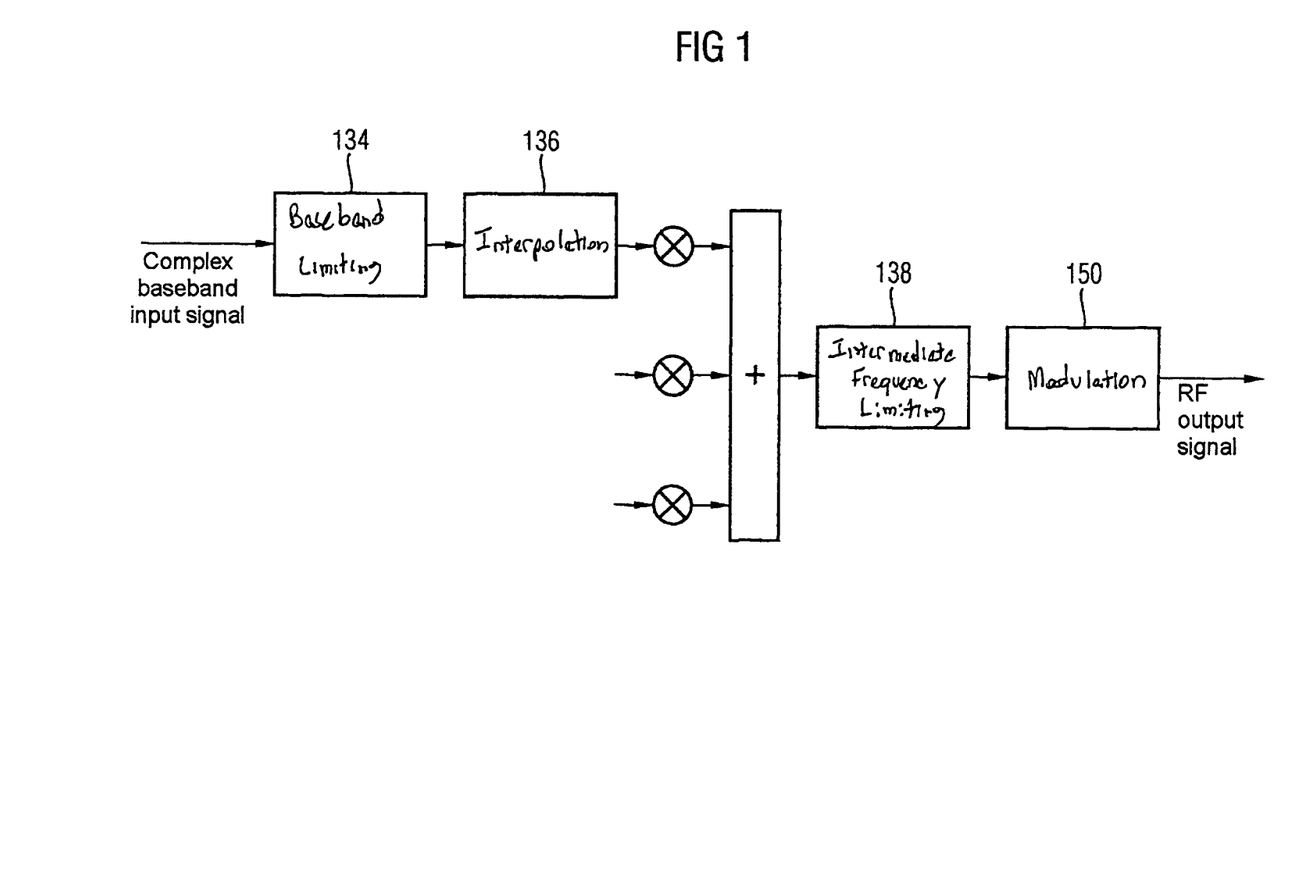
FIG. 1 shows a block diagram of a UMTS transmission system.

FIG. 1 illustrates, in a highly simplified form, a transmission system based on the UMTS (Universal Mobile Telecommunications System) example. In particular, the figure also shows a simplified illustration of production of a transmission signal.

A signal to be transmitted is in this case in the form of an input signal in complex baseband. A baseband limiter (Baseband Clipping) 134 restricts the maximum power of the signal to be transmitted. The bandwidth of the signal is limited by an RRC (Root Raised Cosine) filter in a subsequent block 136 and is raised to a higher sampling rate of a digital intermediate frequency IF by further interpolation filters.

A mixer provides a frequency offset for the signal. A plurality of complex baseband signals can be superimposed on the intermediate frequency, as is indicated in FIG. 1 by a plurality of digital frequency converters. In a further block 138, the signal is subjected to further interpolation and further limiting at the intermediate frequency and, in a further block 150, is possibly subject to even further interpolation, digital/analog conversion and modulation onto the actual radio frequency RF (transformation). FIG. 1 therefore illustrates two different positioning options for the limiting of the transmission signal. These differ essentially in the way in which they distort the RF output signal.

While the baseband limiter 134 can greatly distort the useful signal in the band, thus leading to an increase in the EVM, it only insignificantly influences the adjacent bands, by virtue of the downstream RRC filter. The RRC filter forms linear combinations of the limited useful signal, however, and therefore increases the maximum signal amplitude that occurs. In contrast to this, the intermediate-frequency limiting 138 guarantees the maximum signal amplitude, but produces major interference in the adjacent bands, also referred to as ACLR (Adjacent Channel Leakage Ratio).

Rectangular limiting and circular limiting can be used for signal limiting in OFDM-based systems. In the case of rectangular limiting, the in-phase and quadrature components of the complex signal are limited independently of one another. In the case of circular limiting, the magnitude of the complex baseband signal does not exceed a maximum value.

Figure 2:
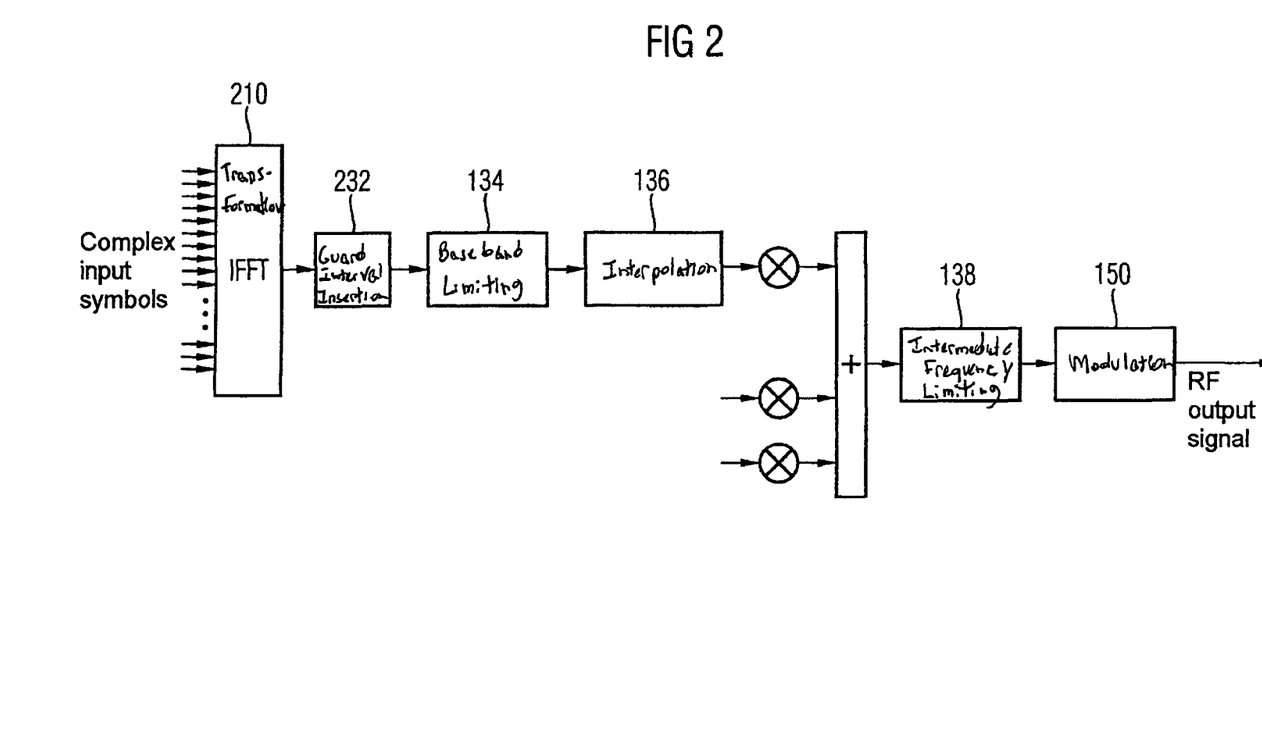
FIG. 2 shows a block diagram of a further OFDM-based transmission system.

FIG. 2 shows a simplified illustration of the transmission signal being produced in OFDM-based systems. In OFDM-based systems, the limiting algorithms, as described with reference to FIG. 1, are used in the same way. However, the complex IQ baseband signal which is received by the baseband limiter 134 originates from IFFT-210 transformed complex input symbols. Furthermore, a guard interval time is inserted between the symbols in a block 232 in many transmission methods.

One disadvantage of baseband limiting, specifically the increase in the maximum signal amplitude resulting from the downstream RRC filter and the further interpolation, can be avoided by advanced calculation of the signal increase to be expected and appropriate limiting of the baseband signal. This results in a reduction in the PAR for the same EVM.

From the statistical point of view, the error is distributed uniformly over the entire baseband, and is spectrally shaped by the subsequent transmission filter. Particularly in the case of high-quality modulation methods, the error tolerance in baseband is less and the effectiveness of this method decreases since this constrains the freedom for signal discrepancies which are intended to allow a reduction in the maximum instantaneous power.

Figure 3:
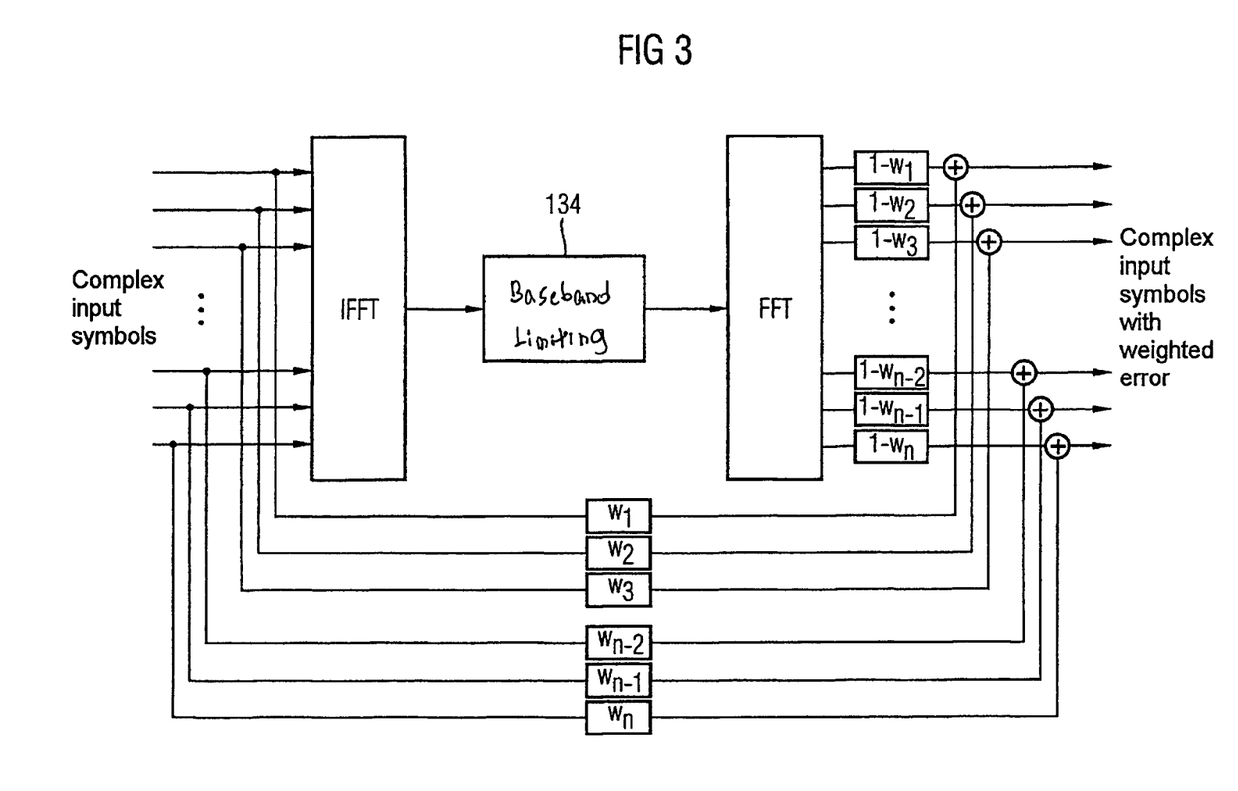
FIG. 3 shows a block diagram of a further transmission system.

However, there are areas which tolerate greater signal discrepancies in the frequency band of the useful signal. These are characterized in that they are located at the edge of baseband, where the signal is more greatly attenuated by virtue of the reception filter in the associated receiver, in that they are located in the unused frequency spectrum of the useful signal, and in that they are not filled with information. This fact is made use of in the system as illustrated in FIG. 3. This allows a greater reduction in the PAR to be achieved for the same EVM.

FIG. 3 shows a simplified illustration of the principle of interpolating limiting, that is to say the production of a limited transmission signal with subcarrier-specific error weighting.

A time signal is first of all produced from the input symbols by IFFT. This is subjected to baseband limiting 134. The time signal that has been modified in this way is transformed back again by an FFT. The original symbols will have been corrupted by the clipping process.

The output signal comprises the input signal, multiplied by wk, and the signal that is subject to an error, multiplied by (1−wk). The accuracy can be adjusted individually for each subcarrier k with the aid of the fixed weighting factors $w_1 \ldots w_n$ ($0 \leq w_k \leq 1$; $k=1 \ldots n$). In this case, $w_k=1$ means maximum accuracy, that is to say no error, and $w_k=0$ means maximum error tolerance. Values by which the error tolerance can be restricted are located in between.

On the output side, a complete FFT is required in order to obtain the subcarrier symbols. In addition, a further IFFT is required in order to produce the transmission signal.

Figure 4:
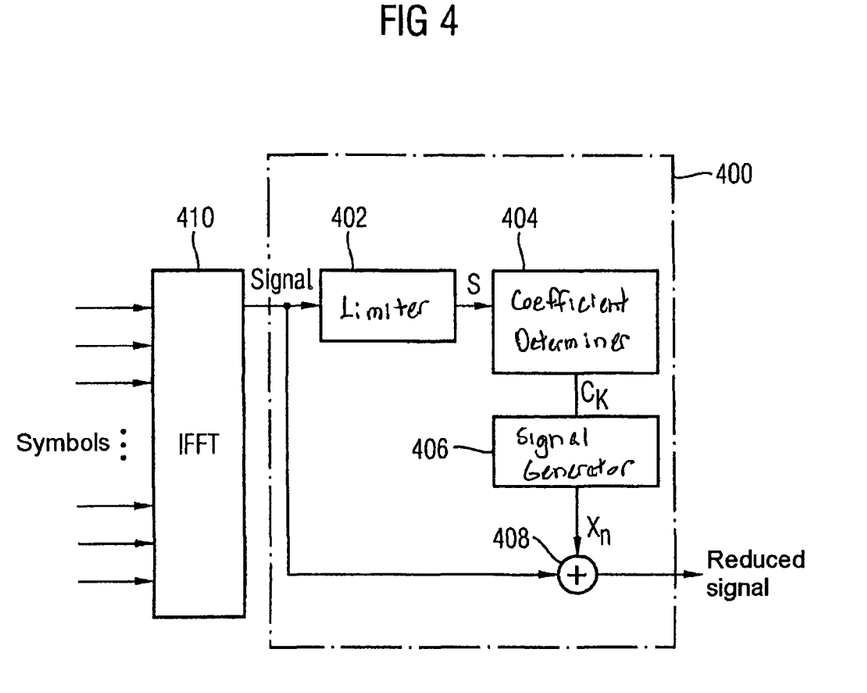
FIG. 4 shows a block diagram of a system having an apparatus according to one exemplary embodiment.

FIG. 4 shows a system having an apparatus 400 for reduction of a signal having a plurality of subcarriers. The apparatus 400 is designed to receive the signal to be reduced and to output a reduced signal. In comparison to the signal to be reduced, the reduced signal may have a limited amplitude. Peak values of the signal to be reduced are preferably reduced in the reduced signal. The apparatus 400 has a limiter 402, a coefficient determiner 404 and a signal generator 406. In addition, the apparatus 400 may have a combiner 408.

The limiter 402 is designed to receive the signal which is to be reduced and has a plurality of subcarriers, to produce a limited signal (S), a so-called clipped signal, from the received signal, and to pass this to the coefficient determiner 404. The limiter 402 may be a known limiter block (clipping block) which is designed to restrict the maximum power of the signal.

The coefficient determiner 404 is designed to receive the limited signal S and to determine coefficients $C_K$ for unused subcarriers in the signal, from the limited signal. According to this exemplary embodiment, a specific coefficient $C_K$ is determined for each unused subcarrier in the signal. No coefficient is determined for used subcarriers. Alternatively, coefficients can be determined only for selected unused subcarriers. The coefficient determiner 404 is also designed to pass the coefficients $C_K$ to the signal generator 406.

The signal generator 406 is designed to receive the coefficients $C_K$ and to generate and provide a reduction signal $X_n$ from the received coefficients.

The signal having a plurality of subcarriers can be reduced, that is to say limited, by a combination of the reduction signal $X_n$ and the signal to be reduced. In particular, it is possible to achieve a reduction in the peak values of the signal. According to this exemplary embodiment, the apparatus 400 has a combiner 408 in the form of an addition circuit, which is designed to add the reduction signal $X_n$ to the signal, and in this way to use the signal to produce a reduced signal which can be provided or output by the apparatus 400.

The apparatus 400 is part of a system which is designed to receive complex input symbols, and to output a time-domain signal. For this purpose, the system has a converter 410 which is designed to receive the complex input symbols and to produce the time-domain signal from the input symbols by a suitable transformation. The converter 410 is also designed to pass the time-domain signal as a signal to the apparatus 400.

The system is a transmission system according to an OFDM-based or OFDMA-based mobile radio standard. The converter 410 is designed to carry out an inverse fast Fourier transformation IFFT. This means that the signal to be reduced may be a complex IQ baseband signal, which is determined from IFFT-transformed complex symbols. A guard interval time (not shown in FIG. 4) can be inserted between each of the symbols. The limiter 402 is designed to carry out baseband limiting.

Each of the coefficients $C_k$ is calculated by symbol-by-symbol projection of the limited signal S, comprising N sample values for a symbol $s_n$; n=1 ... N, onto the k-th base function $$\overline{e}^{+2\pi j \cdot \frac{(k-1)\cdot(n-1)}{N}},$$

which is associated with the respective unused subcarrier. The only values of k which are used are those whose base functions are associated with unused subcarriers. In this case, use is made of the fact that the base functions of all the subcarriers are mutually orthogonal. The coefficients $C_k$ are calculated using the following formula:

$$C_k = \frac{1}{N} \cdot \sum_{n=1}^{N} s_n \cdot e^{-2\pi j \cdot \frac{(k-1)\cdot(n-1)}{N}}, 1 \le k \le N$$

The signal generator 406 is designed to produce the reduction signal $X_n$ $$X_n = \sum_{k=unused} C_k \cdot e^{+2\pi j \cdot \frac{(k-1)\cdot(n-1)}{N}}, n = 1, ... N$$

from these coefficients $C_k$.

A threshold value can be varied in the limiter 402 in order to achieve optimum reduction. Furthermore, the coefficients can be provided with appropriate weighting factors. Depending on the circumstances, both the threshold value and the weighting factors may be fixedly adjustable or variable, in order, for example, to be matched during operation.

Alternatively, the coefficients $C_k$ can also be calculated or determined using other formulae, algorithms or other methods, for example matrix operations.

Figure 5:
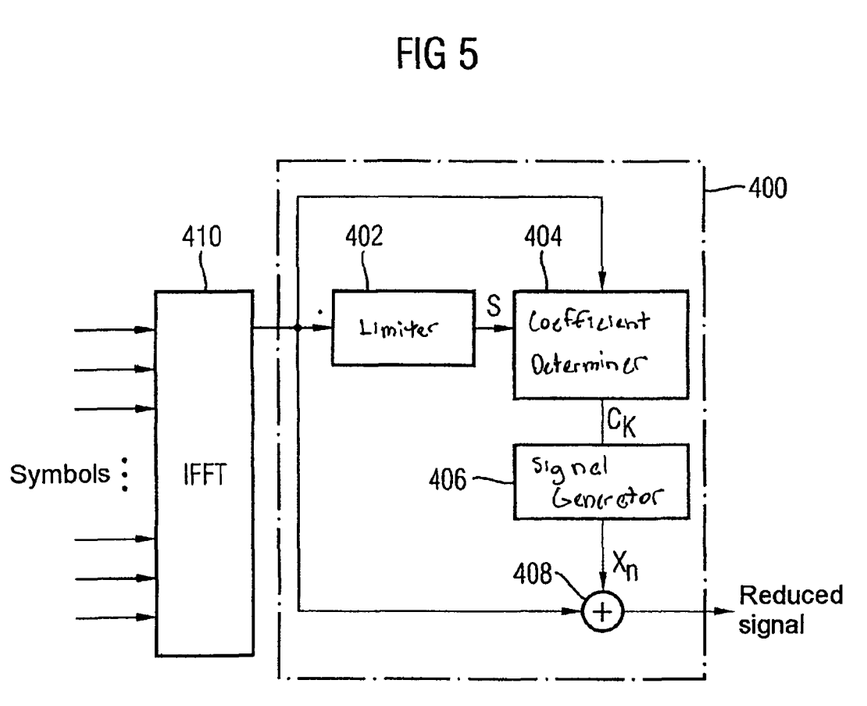
FIG. 5 shows a block diagram of a system having an apparatus according to a further exemplary embodiment.

FIG. 5 shows a further exemplary embodiment of the system shown in FIG. 1. According to this exemplary embodiment, the coefficient determiner 404 is designed to receive both the limited signal S and the signal to be limited. The unlimited signal is therefore also included in the determination of the coefficients $C_K$. The peak values of the signal are therefore reduced while additionally taking account of the unlimited signal.

Figure 6:
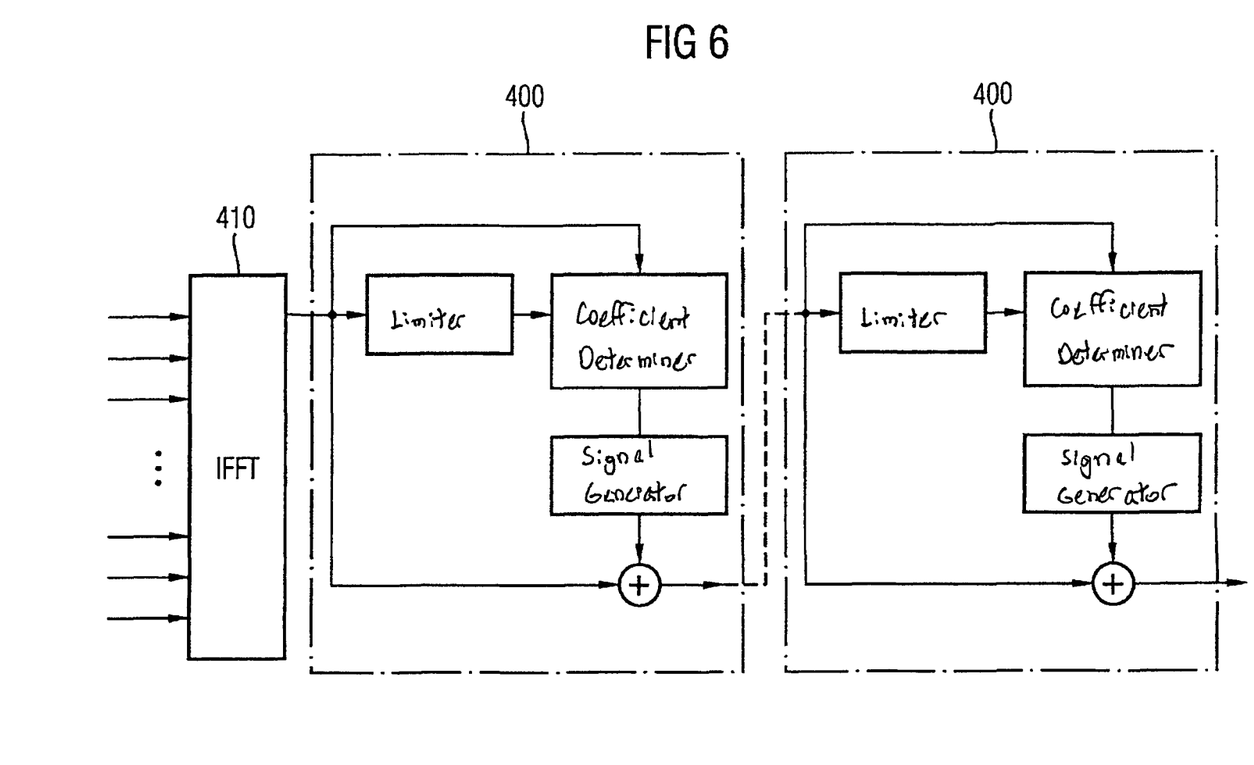
FIG. 6 shows a block diagram of a system according to a further exemplary embodiment.

FIG. 6 shows a further exemplary embodiment of the proposed system. According to this exemplary embodiment, the system is designed to produce and output a time-domain signal, which has been reduced in two or more stages, from the complex input symbols. The system has a converter 410 and two or more apparatuses 400, which are connected in series.

The converter 410 is designed to carry out an IFFT over the complex input symbols, in order to produce the signal and to pass it to a first apparatus 400. The first apparatus 400, which may be any desired one of the apparatuses 400 described above, is designed to receive the signal and to pass this as a reduced signal to the second apparatus 400.

The second apparatus 400 may once again be any desired one of the apparatuses 400 described above. This means that the cascaded apparatuses 400 may be identical or different. The second apparatus 400 is designed to receive the reduced signal from the first apparatus 400, and to reduce it again.

A limiting threshold value and a weighting for the coefficients can be chosen individually in each apparatus 400, which corresponds in each case to a PAPR reduction block. There is no restriction to the number of cascaded apparatuses 400, and the number may be chosen depending on the situation.

The proposal has been described with reference to mobile radio transmission systems, although it is not limited to systems such as these. In fact, the approach can be used for all systems in which it is desirable to limit a signal.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. An apparatus for producing a reduction signal for an input signal having a plurality of subcarriers, comprising:
    a limiter to produce a limited signal from the input signal having the plurality of subcarriers;
    a coefficient determiner to determine coefficients for unused subcarriers of the input signal having the plurality of subcarriers, from the limited signal; and
    a signal generator to generate the reduction signal from the coefficients, which reduction signal can be combined with the input signal to form a reduced signal, wherein
    the coefficient determiner determines the coefficients from the limited signal and the input signal, and
    the coefficient determiner determines the coefficients using a matrix operation on the input signal and the limited signal.

2. The apparatus as claimed in claim 1, wherein
    the apparatus further comprises an adder to combine the input signal with the reduction signal in order to form the reduced signal.

3. The apparatus as claimed in claim 2, wherein
    the coefficient determiner uses weighting factors to determine the coefficients.

4. The apparatus as claimed in claim 3, wherein
    the input signal is a modulated signal having more than two possible information states per symbol,
    the limited signal comprises N sample values per symbol $s_n$; n=1 ... N, and the coefficient determiner determines the coefficients using symbol-by-symbol projection of the limited signal onto a k-th base function $$\overline{e^{+2\pi j \cdot \frac{(k-1)-(n-1)}{N}}},$$

which is associated with a k-th unused subcarrier.

5. The apparatus as claimed in claim 4, wherein the coefficient determiner calculates a coefficient for the k-th unused subcarrier using the following formula:

$$C_k = \frac{1}{N} \cdot \sum_{n=1}^{N} s_n \cdot e^{-2\pi j \cdot \frac{(k-1)-(n-1)}{N}}, 1 \leq k \leq N.$$

6. The apparatus as claimed in claim 5, wherein the signal generator calculates the reduction signal using the formula $$X_n = \sum_{k=unused} C_k \cdot e^{+2\pi j \cdot \frac{(k-1)-(n-1)}{N}}, n = 1, \ldots N.$$

7. The apparatus as claimed in claim 6, wherein the limiter has an adjustable limiting threshold value which defines how strongly the input signal can be limited.

8. The apparatus as claimed in claim 1, wherein the coefficient determiner uses weighting factors to determine the coefficients.

9. The apparatus as claimed in claim 1, wherein the input signal is a modulated signal having more than two possible information states per symbol, the limited signal comprises N sample values per symbol $s_n$; n=1 ... N, and the coefficient determiner determines the coefficients using symbol-by-symbol projection of the limited signal onto a k-th base function $$\overline{e^{+2\pi j \cdot \frac{(k-1)-(n-1)}{N}}},$$

which is associated with a k-th unused subcarrier.

10. The apparatus as claimed in claim 9, wherein the coefficient determiner calculates a coefficient for the k-th unused subcarrier using the following formula:

$$C_k = \frac{1}{N} \cdot \sum_{n=1}^{N} s_n \cdot e^{-2\pi j \cdot \frac{(k-1)-(n-1)}{N}}, 1 \leq k \leq N.$$

11. The apparatus as claimed in claim 10, wherein the signal generator calculates the reduction signal using the formula $$X_n = \sum_{k=unused} C_k \cdot e^{+2\pi j \cdot \frac{(k-1)-(n-1)}{N}}, n = 1, \ldots N.$$

12. The apparatus as claimed in claim 1, wherein the limiter has an adjustable limiting threshold value which defines how strongly the input signal can be limited.

13. A system for producing a time-domain signal from complex input symbols, comprising:
    a converter to transform the complex input symbols into an input signal with a plurality of subcarriers in accordance with a predetermined transformation; and
    an apparatus for producing a reduction signal for the input signal having the plurality of subcarriers, comprising:
        a limiter to produce a limited signal from the input signal having the plurality of subcarriers;
        a coefficient determiner to determine coefficients for unused subcarriers of the input signal having the plurality of subcarriers, from the limited signal; and
        a signal generator to generate the reduction signal from the coefficients; and
    an adder to add the reduction signal to the input signal having the plurality of subcarriers to form a reduced signal, with the reduced signal corresponding to the time-domain signal, wherein
    the coefficient determiner determines the coefficients from the limited signal and the input signal, and
    the coefficient determiner determines the coefficients using a matrix operation on the input signal and the limited signal.

14. The system as claimed in claim 13, wherein the system has first and second apparatuses for producing the reduction signal, and the first and second apparatuses are connected in series.

15. The system as claimed in claim 13, wherein the predetermined transformation is an inverse Fourier transformation.

16. The system as claimed in claim 13, wherein the system is an Orthogonal Frequency Division Multiplexing (OFDM)-based or an Orthogonal Frequency Division Multiple Access (OFDMA)-based transmission system.

17. A method for producing a reduction signal for an input signal having a plurality of subcarriers, comprising:
    producing a limited signal from the input signal having the plurality of subcarriers;
    determining coefficients for unused subcarriers of the input signal having the plurality of subcarriers, from the limited signal; and
    generating the reduction signal from the coefficients, which reduction signal can be combined with the input signal having the plurality of subcarriers to obtain a reduced signal, wherein
    the coefficients are determined from the limited signal and the input signal, and
    the coefficients are determined using a matrix operation on the input signal and the limited signal.

\* \* \* \* \*

UNITED STATES PATENT AND TRADEMARK OFFICE
CERTIFICATE OF CORRECTION

PATENT NO. : 8,467,463 B2  Page 1 of 1
APPLICATION NO. : 12/312578
DATED : June 18, 2013
INVENTOR(S) : Bernd Hassler et al.

It is certified that error appears in the above-identified patent and that said Letters Patent is hereby corrected as shown below:

On the Title Page, Col. 1, Item (75) (Inventors), Lines 1-2, Delete "Gunter Wolf," and Insert -- Gunter Wolff, --, therefor.

Signed and Sealed this
Twenty-third Day of December, 2014

Michelle K. Lee
*Deputy Director of the United States Patent and Trademark Office*